United States Patent
Tangorra

[15] 3,655,454
[45] Apr. 11, 1972

[54] PROCESS FOR PRODUCING A HOLLOW BODY OF NONDEVELOPABLE FORM FROM A STARTING MATERIAL OF A DEVELOPABLE FORM

[72] Inventor: Giorgio Tangorra, Milan, Italy
[73] Assignee: Industrie Pirelli S.p.A.
[22] Filed: Jan. 13, 1970
[21] Appl. No.: 2,500

[30] Foreign Application Priority Data

Jan. 20, 1969  Italy..............................11,737 A/69

[52] U.S. Cl..............................156/132, 152/356, 156/221, 264/90, 264/295, 264/313, 264/314, 264/326
[51] Int. Cl. .........................................B29h 7/03, B29h 17/22
[58] Field of Search..................264/89, 90, 92, 93, 294, 295, 264/313–315, 320, 322, 326, 339; 152/354, 356, 361; 156/110, 123, 126–133, 221, 226

[56] References Cited

UNITED STATES PATENTS

| 1,210,154 | 12/1916 | Dykes.....................................156/110 |
| 1,779,391 | 10/1930 | Darrow...............................156/110 X |
| 1,603,312 | 10/1926 | Burdette.............................264/90 X |
| 3,505,443 | 4/1970 | Friesner....................................264/92 |
| 3,373,066 | 3/1968 | Hindin...............................152/361 X |

Primary Examiner—Robert F. White
Assistant Examiner—J. H. Silbaugh
Attorney—Stevens, Davis, Miller & Mosher

[57] ABSTRACT

A process for manufacturing a hollow body having a nondevelopable form from a single piece of starting material which is flexible and which is either flat or in a developable form. The process involves the formation of folds or corrugations in the starting material and the subsequent shaping of same into a nondevelopable form with an accompanying unfolding of the corrugations thereby providing the additional length of material needed to satisfy the nondevelopable form.

4 Claims, 16 Drawing Figures

PATENTED APR 11 1972

INVENTORS
GIORGIO TANGORRA

BY Stevens, Davis,
Miller & Mosher
ATTORNEYS

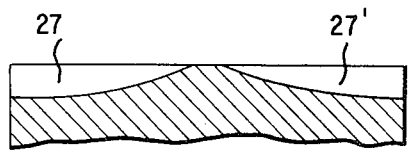
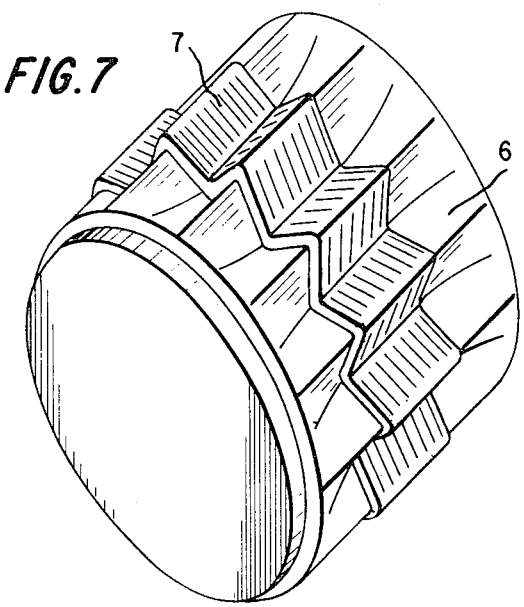
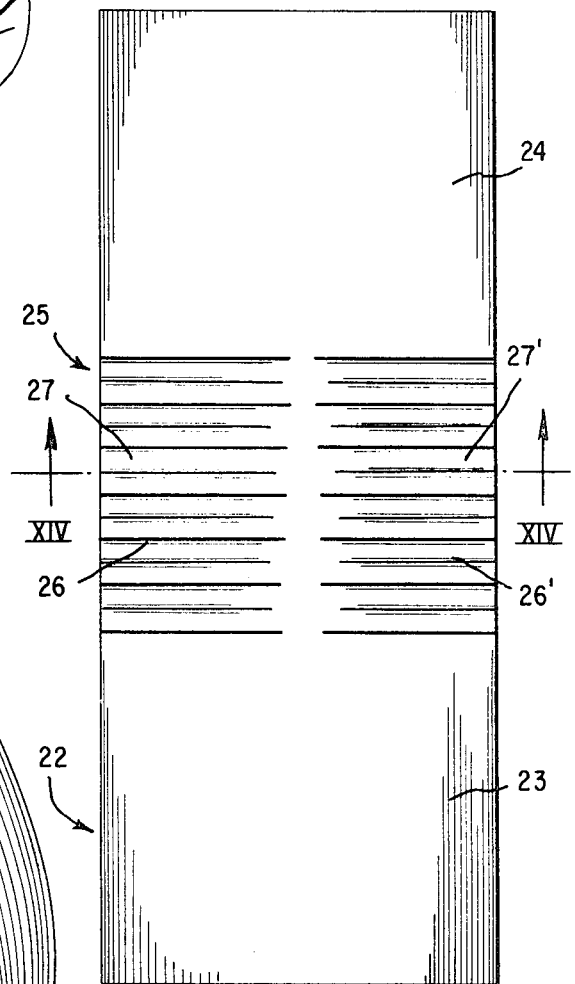
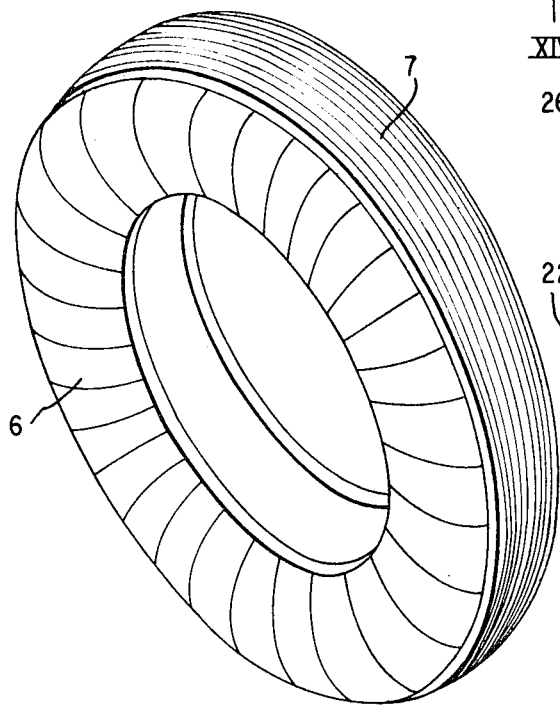

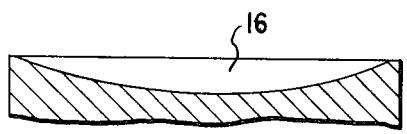
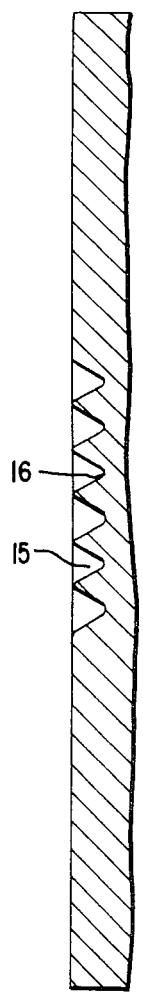
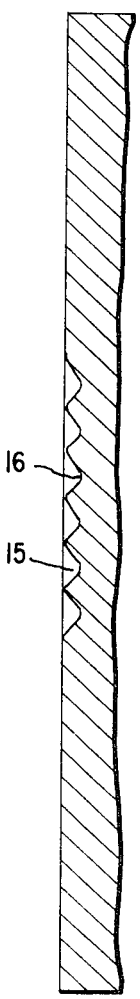
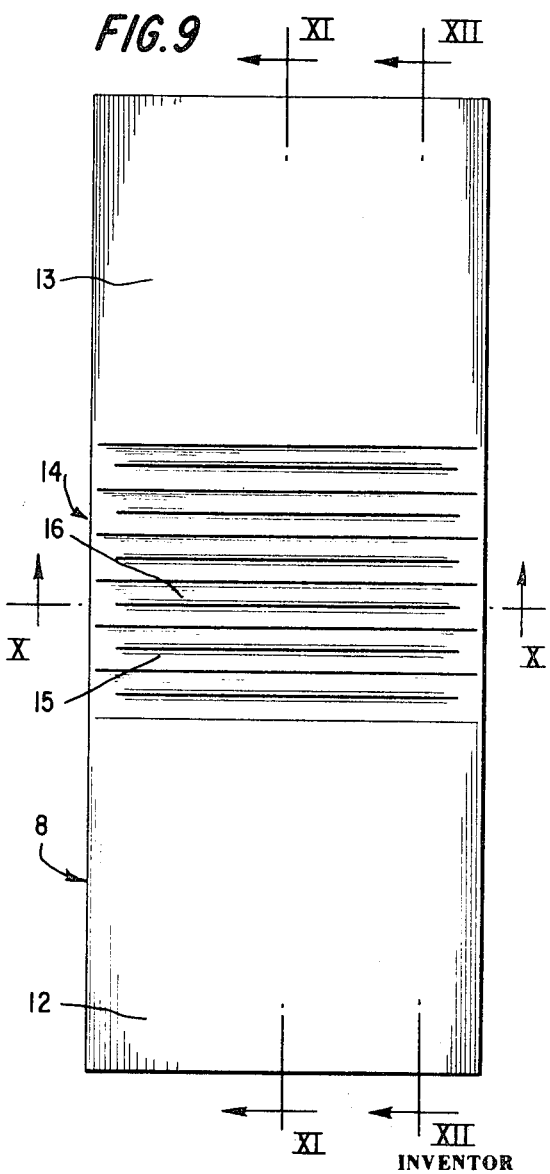

INVENTOR
GIORGIO TANGORRA

BY Stevens, Davis
Miller & Mosher
ATTORNEYS

PROCESS FOR PRODUCING A HOLLOW BODY OF NONDEVELOPABLE FORM FROM A STARTING MATERIAL OF A DEVELOPABLE FORM

The present invention relates to a process for producing hollow bodies, having relatively thin walls and nondevelopable forms and involving the use of sheets having developable forms as starting material. In particular, the invention relates to the manufacture of said hollow bodies by starting from flat sheets of plastic material or of rubberized cord fabric, namely a fabric constituted by a layer of parallel cords, embedded in rubber.

In the present specification, the expression "nondevelopable" surface or form means a surface which cannot be laid on a plane surface without undergoing stretching or compression. Such surfaces, as are known from analytical geometry, are characterized in that the product of the two main curvatures (total curvature) is not zero. Examples of said surfaces are spherical and toroidal surfaces.

The expression "developable" surface or form means, instead, a surface which can be laid on a plane surface without undergoing stretching or compression. Such surfaces, as are known from analytical geometry, are characterized in that the product of the two main curvatures is zero. Examples of such surfaces, besides of course a plane surface, are cylindrical or conical surfaces.

The difficulty in producing a body having a nondevelopable form, for instance a toroidal one, from a flat sheet starting material, is evident because it is necessary to impart deformations in the starting material, which deformations always are difficult to regulate.

The invention is particularly applicable to the production of carcasses for radial tires wherein strips of cord fabric are the starting material.

Radial tires comprise a carcass formed by cords lying in planes which contain the axis of rotation of the tire and an inextensible breaker structure disposed between the carcass and the tread.

As is known to those skilled in this art, said tires are built up by disposing strips of cord fabric on a cylindrical drum in such a way that their cords are parallel to the cylinder axis; then the obtained structure is immediately subjected to an operation, called "shaping", which converts the cylindrical structure (which is a developable form) into a toroidal structure (which is a nondevelopable form). During said operation, the structure is subjected to considerable deformations along its central portion, whose diameter must be considerably increased. Such deformations, in most cases, are hardly controllable and can give rise to irregular spacings between the cords.

Other articles which can be advantageously produced according to the process described in the present invention are inflatable boats. Said boats, which are constituted by tubular bodies of rubberized fabric and also of curvilinear shape, have been produced up to the present time by joining together several pieces of flat fabric, shaped in such a way to obtain approximately the desired curved shape. This process, obviously, is complicated and expensive.

In both of the foregoing examples, the disadvantages thereof are traceable to originate the difficulty of obtaining a nondevelopable form.

The purpose of the present invention is to provide a process whereby it is possible to produce, in an easy and controllable manner, deformations from which nondevelopable surfaces may result.

An object of the present invention is the realization of a process, which is simple and economical, for producing a hollow body of nondevelopable form from a starting material which has a developable form.

Other objects are those which are inherent in the invention as disclosed herein.

The process of this invention generally involves starting from a sheet of flexible material, stretchable along at least one direction and having a developable form, and then:

a. deforming the sheet permanently by embossing onto it a plurality of corrugations having a path orthogonal with respect to the direction of stretching of the sheet and a depth variable along their extension; and b. pushing the crests comprised between the corrugations in a direction suitable to impart to the sheet a nondevelopable form.

As mentioned, the invention is particularly useful when it is wished to use the rubberized cord fabric as basic material, so that in a preferred embodiment said invention relates to a process as described above, in which the sheet is constituted by a highly anisotropic material, as for instance a rubberized cord fabric, characterized in that it comprises the further operation of superimposing on said sheet, already deformed to form the corrugations, one or more elements which concern at least a part of the extension of the corrugations, said elements being disposed in a direction substantially orthogonal with respect to said corrugations so as to follow the profile of the latter and being practically inextensible in said direction orthogonal to the corrugations.

When it is wished to manufacture a tire carcass, said preferred embodiment comprises the further steps of:

a. positioning the cord fabric around a cylindrical drum provided with grooves disposed in the direction of its generatrices and having a minimum depth at their ends and a maximum depth in an intermediate section, the wires of the cord fabric being parallel to said grooves; and b. positioning inextensible bead cores at the edges of the cord fabric, the step of embossing said corrugations on said cord fabric consisting in causing the adhesion of the fabric to the bottom of the grooves.

On the contrary, when it is wished to obtain a tubular curved body to be used for instance as the fore part of an inflatable boat, said preferred embodiment comprises the further steps of:

a. positioning the cord fabric on a flat rigid support of quadrilateral shape provided with parallel grooves having a minimum depth at their ends and a maximum depth in an intermediate section, the wires of the cord fabric being parallel to said grooves;

b. joining the cord fabric, already shaped by the embossment of corrugations and already provided with said inextensible elements, along its edges; and c. disposing along the tubular element, in its zone not concerned by the grooves, one or more elements inextensible in the direction of their length, the step of embossing said corrugations on said cord fabric consisting in causing the adhesion of the fabric to the bottom of the grooves.

In the above described embodiments, the step of embossing the corrugations on the cord fabric by causing the fabric to adhere on the groove bottom can be carried out in various ways; for instance: by a die of soft material carrying in relief the shape of the grooves; or by suction from openings provided on the groove walls; or by superimposing a flexible and inflatable body on the cord fabric and by inflating said body.

The invention will be described in greater detail with reference to the attached drawings in which.

Figure 1:
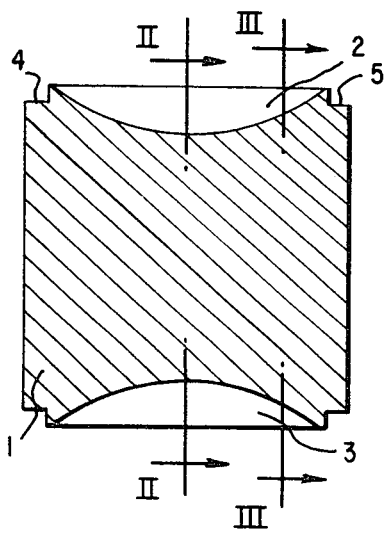
FIG. 1 is an axial section view of a drum for the manufacture of a toroidal body.
Figure 2:
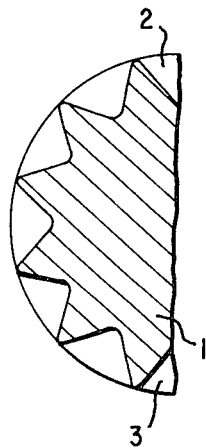
FIG. 2 is a partial section view taken along plane II—II of FIG. 1.
Figure 4:
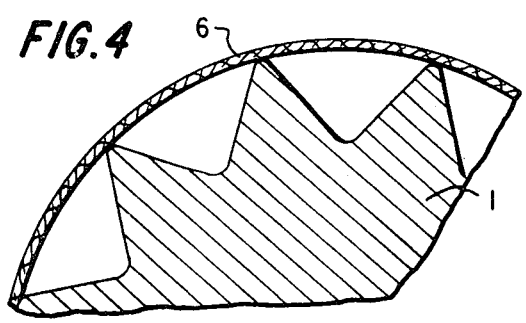
Figure 5:
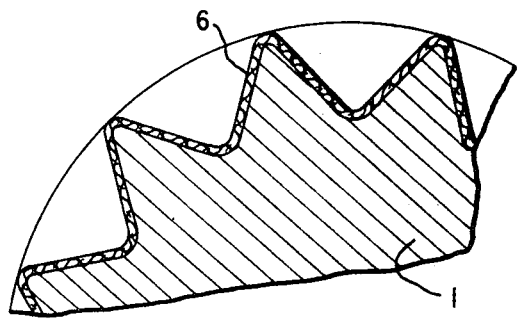
Figure 6:
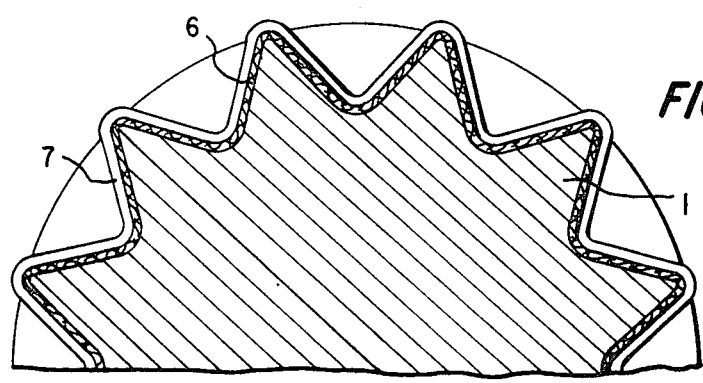
Figure 15:
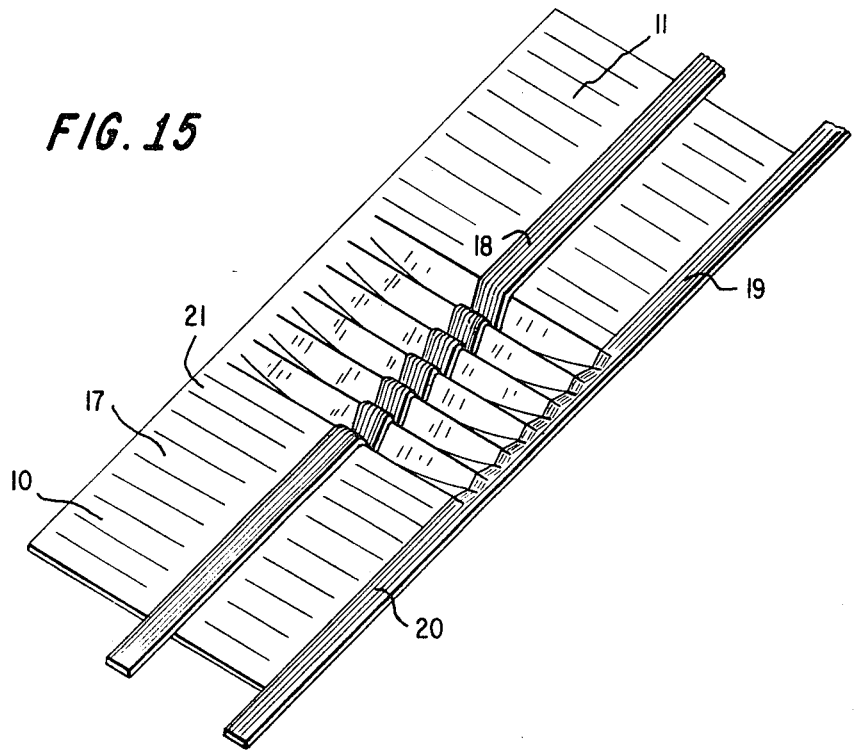
Figure 16:
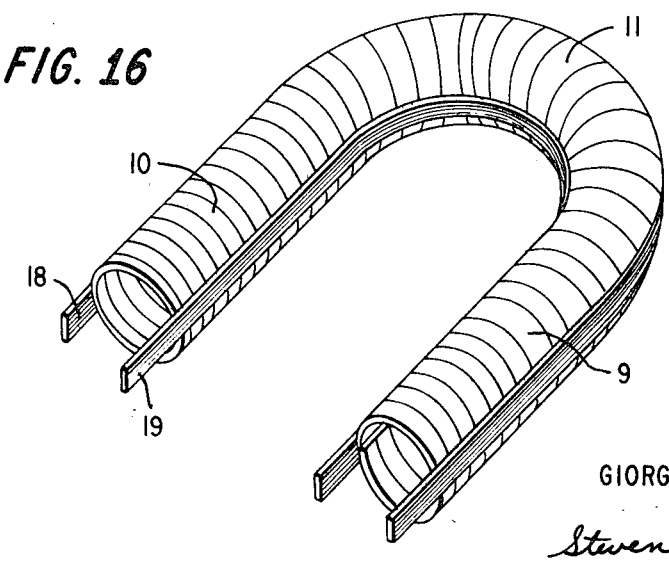

FIGS. 4, 5, and 6 are enlarged detail views of FIG. 2 at different steps of the process;

FIG. 7 is an isometric view of the semifinished product after completion of the steps carried out on the drum of FIG. 1;

FIG. 8 is an isometric view of a toroidal body in finished condition;

FIG. 9 is a view from the top of a mould for the production of a tubular curved body;

FIG. 10 is a section view taken along plane X—X of FIG. 9;

FIG. 11 is a section view taken along plane XI—XI of FIG. 9;

FIG. 12 is a section view taken along plane XII—XII of FIG. 9;

FIG. 13 is a view from the top of a mould for the production of a tubular curved body according to an alternative embodiment of the invention;

FIG. 14 is a section view taken along plane XIV—XIV of FIG. 13;

FIG. 15 illustrates the semifinished product removed from the mould of FIG. 9; and FIG. 16 illustrates the tubular curved body in finished condition.

Figure 3:
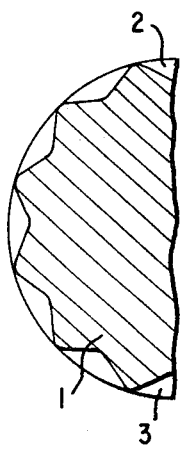
FIG. 3 is a partial section view taken along plane III—III of FIG. 1.

FIGS. 1 to 3 illustrate a building drum 1, suitable for the manufacture of a toroidal body which can be used as the carcass of radial tires.

Said drum is provided with a plurality of grooves (two of which are respectively indicated as 2 and 3) having a path generically parallel to the drum axis and a depth varying from the central zone to the lateral zones.

Two steps 4 and 5, also called "drum shoulders", are provided at the two ends of the drum.

With reference to FIG. 4, the manufacture of the tubular body is started by superimposing on the drum 1 a strip of cord fabric 6, the cords of which are parallel to the drum axis. In the next building up step (see FIG. 5), the fabric 6 is caused to adhere to the grooves, for instance by means of a die of soft material, not illustrated; alternatively, the fabric can be caused to adhere to the groove walls by a suction induced through holes existing on said walls.

At this moment the fabric 6 has undergone some local deformations at each groove; the result of said deformations is that the circumferential development of the fabric is increased in the median zone of the drum; namely, just in that zone where the passage from the cylindrical shape to the toroidal shape, in the so-called "shaping" operation, requires a greater length.

In conventional shaping methods, the increase of development takes place during the shaping phase and is distributed along the whole circumference; consequently, said increase is hardly controllable. In the process according to the present invention, the increase of development occurs gradually; namely, it is subdivided into as many small parts as there are drum grooves; and therefore, as there are corrugations in the fabric, so that the deformations are much more easily controllable.

The next process step illustrated in FIG. 6 consists in the application of an inextensible reinforcing element 7, constituted for instance by strips of cord fabric in which the cords lie in planes perpendicular to the drum axis or form comparatively small angles with said planes. The application of the element 7 is carried out by following the crests and the corrugations of the fabric 6 in the median zone of the drum. In a conventional way, already known to those skilled in the art, the so-called bead cores are applied on the shoulders 4 and 5 of the drum, and the fabric 6 is turned up about them.

The resulting structure is shown in FIG. 7; also in this case, said structure is generically cylindrical, but it is deformed in such a way as to be prepared for the shaping operation which will convert it into a toroidal one, virtually without further deformations; the maximum diameter of the toroidal structure is well defined by the inextensible element 7, so that the shaping operation will give accurate results even without the precautions which it is necessary to adopt in conventional methods. In fact, in known methods, the inextensible element can be applied only at the end of the shaping operation, so that during said operation there are no elements in the structure which may limit its increase in diameter, and this requires the adoption of particular arrangements to obtain the desired size.

Finally, FIG. 8 illustrates the resistant structure of a radial tire obtained by shaping the structure shown in FIG. 7. Such shaping can take place without any risk according to any conventional shaping method; for instance, by means of a so-called expansible drum, consisting of two discs which keep under tension a cylindrical membrane, made of rubber, and which can be approached mutually while a fluid under pressure is admitted into the drum.

These resistant structures are then to be completed, in a manner well known to those skilled in the art, by application of rubber bands, obtained by extrusion, which are intended to form the tire sidewalls and the tread. The application of all the auxiliary elements which are often used in pneumatic tires, as for instance flippers, edges, reinforcing strips, and so on, if of course possible. After the application of all the components, the curing operation is carried out in a conventional way.

FIGS. 9 to 12 illustrate a mould 8 able to produce a partially curved tubular body intended to form a part of an inflatable boat; the tubular body (see FIG. 16) comprises two rectilinear portions 9 and 10 joined together by a semicircular portion 11.

The mould 8 comprises two smooth parts 12 and 13 and between them a part 14 on which several grooves are provided, two of which are indicated with the reference numerals 15 and 16.

In the central zone of the mould, the grooves have a maximum depth and at its edges have a minimum depth. (See in particular FIG. 10.)

To produce the tubular body, a cord fabric 17 (FIG. 15), in which the cords are parallel to the direction of the grooves 15 and 16, is positioned on the mould 8. The fabric 17 is made to adhere to said mould 8 by any expedient among those aforementioned; and then inextensible reinforcing elements 18 and 19, the first positioned in the median zone and the second along one of the edges 20 of the fabric 17, are applied over the fabric. The inextensible element 18 is made to adhere to the fabric 17 so that it conforms to the corrugations therein corresponding to the grooves 15 and 16.

The opposite edge 21 of the fabric 17 is then joined to the edge 20 to form a tubular body.

The tubular body is then finally shaped by extending the corrugation folds. This operation can be advantageously effected by closing one end of the tubular body and by inflating the latter from the other end. In this way the corrugations in the inextensible element 18 are compelled to unfold and to reach a circumferential development greater than that realized along the inextensible element 19, so that the structure assumes an appearance as illustrated in FIG. 16. The structure of FIG. 15 is prepared to assume the shape shown in FIG. 16 virtually without further stretchings. When the structure has reached its final shape, such as in FIG. 16, it is cured.

FIGS. 13 and 14 show a mould 22, which constitutes an alternative embodiment of the mould 8 illustrated in FIGS. 9 to 12, and which permits the obtaining of a structure similar to that illustrated in FIG. 16. The mould 22 comprises two smooth portions 23 and 24, and a central portion 25 having two sets of grooves 26,26' and 27,27'. Said grooves reach their minimum depth in the median zone of the mould and their maximum depth at its edges.

The operation in this case is similar to that of the preceding embodiment. First, a cord fabric and then an inextensible element are positioned along the median zone and a further inextensible element is positioned along one of the edges. Subsequently, the two edges of the cord fabric are joined, care being taken that each corrugation on one edge coincides with the corresponding corrugation on the other edge.

Obviously, the final structure obtained is analogous to that shown in FIG. 16, the only difference being that in the FIG. 14 embodiment the splice between the two edges is along the outer side of the curve of the tubular element, instead of being along the inner (smaller diameter) side as is the case in FIG. 16.

It is understood that the herein presented details of preferred embodiments are illustrative and not limitative and that the present invention includes any further embodiment deriving from the herein disclosed inventive principles. For instance the position of the inextensible elements applied to the cord fabric can be varied in such a way as to obtain curvilinear or mixed shapes, different from those illustrated herein. In particular, by means of this process, it is also possible to obtain curved forms not lying in a plane.

The flexible material may be conformed to the shape of the grooves in order to form the corrugations therein by various techniques. For example, the material can be pressed into the grooves by means of a die complementarily formed relative to the grooves and preferably of a soft or yieldable material. Alternatively, an inflatable flexible body could be superimposed over the flexible material and then inflated in order to press the flexible material into the grooves by virtue of the inflation pressure.

What is claimed is:

1. A process for producing a hollow body of a nondevelopable form starting from a sheet of material of a developable form, this sheet being composed of a flexible and highly anisotropic material, such as a rubberized cord fabric or a compound incorporating short fibers of another material running in a pre-arranged direction, comprising the following steps:
   a. forming a plurality of corrugations in said material, said corrugations having a direction parallel to that in which said material is less stretchable and having a varying depth along their lengthwise extent;
   b. applying to the corrugated material at least two stabilizing elements which are substantially inextensible in a perpendicular direction to the lengthwise extent of said corrugations, the first of said stabilizing elements being in the area of minimum depth of said corrugations, the second in the area of maximum depth of said corrugations, so as to follow the profile of the corrugations themselves; and
   c. unfolding said corrugations so as to make said material take on said nondevelopable form which is defined by the variation in depth of the corrugations and limited by said stabilizing elements.

2. Process as in claim 1, adapted for producing a toroidal hollow body open along the inner curve, such as a tire, comprising the following steps:
   a. positioning a cord fabric around a cylindrical drum having axially extending grooves, said grooves having a minimum dept at their ends and a maximum depth intermediate of said ends, said cord fabric having its cords running parallel to said grooves;
   b. forming corrugations in said cord fabric by conforming the fabric to the profile of said grooves;
   c. trimming the edges of the corrugated cord fabric so that said edges are parallel to each other;
   d. applying to said corrugated cord fabric near each lateral edge thereof a first stabilizing element consisting of a metal bead core which is inextensible in a circumferential sense;
   e. folding around each bead core, an edge of said cord fabric, said edge having a size equal to that of normal tire turnings;
   f. placing on said corrugated cord fabric in the area of said corrugations' maximum depth, a second stabilizing element substantially inextensible in a perpendicular direction with respect to the longitudinal extent of said corrugations, said second element consisting of a narrow strip of cord, running substantially in said perpendicular direction with respect to the corrugations, said strip having a width equal to that of normal radial tire breaker strips and a length sufficient to extend along the whole circumference of the area at which it is applied, following the profile of the corrugations themselves;
   g. expanding said corrugations so as to cause said cord fabric to take on said toroidal form open along the inner curve; and, then
   h. applying to the product thus obtained other elements normally employed in tire manufacture such as tread band, sidewalls, reinforcing strips, filling strips, and subsequently curing the afore-assembled product.

3. Process as in claim 1, adapted for producing a curved tubular body, comprising the following steps:
   a. positioning said cord fabric on a flat rigid support having a quadrilateral form and parallel grooves, said grooves having a varying depth between their ends and a point intermediate of said ends, said fabric having its cords running parallel to the longitudinal extent of said grooves;
   b. forming corrugations in said cord fabric by conforming the fabric to the profile of said grooves;
   c. trimming the edges of the corrugated cord fabric so that said edges are parallel to each other;
   d. applying to said shaped cord fabric, in the areas of minimum and maximum depth respectively of the corrugations, stabilizing elements substantially inextensible in a perpendicular direction with respect to the longitudinal extent of said corrugations, said stabilizing elements each consisting of a narrow strip of cord running substantially in said perpendicular direction with respect to the corrugations, said strips having a length at least equal to that necessary to extend along the entire peripheral extent of the corrugations, at the area in which they have been applied, following the profile of the corrugations themselves;
   e. joining the edges of said cord fabric which run in the said direction perpendicular to the corrugations, maintaining the perpendicular position between the cords of said fabric and the cords of said strips; and
   f. expanding said corrugations in such a direction as to make said cord fabric take on said curved tubular form.

4. Process as in claim 4, adapted for producing a curved tubular body comprising the step of positioning said cord fabric on a flat rigid support having a quadrilateral form and a series of grooves along each of the two opposite sides, said grooves being substantially perpendicular to said sides and terminating on them, said grooves having a maximum depth in the area of said sides and a minimum depth intermediate of said ends.

* * * * *